US006016593A

United States Patent [19]

Kyrstein

[11] Patent Number: 6,016,593

[45] Date of Patent: Jan. 25, 2000

[54] ELECTRIC DRIVE SYSTEM FOR PLANER MILL INFEED AND OUTFEED ROLLS

[75] Inventor: John Per Kyrstein, Prince George, Canada

[73] Assignees: Kyrstein Investments Ltd.; Toop Holdings Ltd., both of Prince George, Canada

[21] Appl. No.: 09/058,230

[22] Filed: Apr. 10, 1998

[51] Int. Cl.[7] .......... B23P 13/00

[52] U.S. Cl. .......... 29/401.1; 198/615

[58] Field of Search .......... 29/401.1; 198/615, 198/861.1, 866

[56] References Cited

U.S. PATENT DOCUMENTS

| | | | |
|---|---|---|---|
| 4,362,065 | 12/1982 | Baratti | 29/401.1 |
| 4,541,160 | 9/1985 | Roberts | 29/401.1 |
| 4,669,166 | 6/1987 | Grimes | 29/401.1 |
| 4,677,726 | 7/1987 | Williams | 29/401.1 |
| 4,741,084 | 5/1988 | Ronk | 29/401.1 |
| 5,351,807 | 10/1994 | Svejkovsky | 198/750 |

*Primary Examiner*—S. Thomas Hughes
*Assistant Examiner*—Jermie E. Cozart
*Attorney, Agent, or Firm*—Oyen Wiggs Green & Mutala

[57] ABSTRACT

A method and apparatus for converting a conventional mechanical or hydraulic system for driving the infeed and outfeed rolls of a planer mill or a similar conveyor to variable frequency electric power. The method involves disconnecting the roller shafts from pre-existing mechanical and hydraulic drive components housed within the conveyor gearbox or other support frame. The electric motors are mounted at fixed positions on a panel rigidly connected to the gearbox or other support frame at a location spaced-apart from the roller shafts. Each motor is coupled to a corresponding roller shaft by means of a connector drive shaft having universal joint couplers at each end thereof. This arrangement permits displacement of the roller shafts during normal operation of the conveyor without transferring torque forces to the electric motors. The speed of each motor and hence each roller may be independently controlled by a frequency inverter which is operable by remote control.

3 Claims, 5 Drawing Sheets

ELECTRIC DRIVE SYSTEM FOR PLANER MILL INFEED AND OUTFEED ROLLS

TECHNICAL FIELD

This application relates to a method and apparatus for converting a conventional mechanical or hydraulic system for driving the infeed and outfeed rolls of a planer mill to variable frequency electric power.

BACKGROUND

Sawmill production lines typically employ rotating press roller assemblies to convey lumber at a controlled rate through saws, planers or other wood processing equipment. The rollers rotate about shafts which are connected to sprockets housed within a gearbox. Rotation of the sprockets and hence the roller shafts is driven by a long serpentine drive chain usually powered by a single electric motor. This type of mechanical drive system requires relatively costly maintenance. For example, the drive chain and sprocket system must be maintained in an oil bath for optimum performance.

Some planer mill infeed and outfeed rolls may alternatively be driven by hydraulic power to allow for variable frequency operation. Variable frequency operation is desirable, for example, for optimum processing of lumber pieces of different sizes (smaller pieces may require less planing and may be fed through the mill at a faster rate). Various hydraulic drive systems are in use. According to one existing system, a relatively small hydraulic motor is mounted on each roll shaft and is driven by a remote hydraulic pump. A torque arm is provided for counteracting rotation of the roller shafts. Such hydraulic drive systems are also relatively expensive to maintain and may result in environmental contamination and increased fire danger due to oil leaks from hydraulic pumps, motors, hoses, fittings or the like.

One strategy for overcoming the shortcomings of conventional mechanical and hydraulic drive systems is to couple each roller shaft directly to an electric motor. However, during normal operation planer mill roller shafts are deflected up and down depending upon the size and position of lumber passing through the mill. Previous attempts to mount electric motors directly on the ends of roller drive shafts have failed due to the weight of the motors and mechanical problems arising from periodic roller deflection.

The need has therefore arisen for a method and apparatus for economically converting a planer mill drive system from conventional mechanical or hydraulic power to variable frequency electric power.

SUMMARY OF INVENTION

In accordance with the invention, a method of converting a pre-existing conveyor drive mechanism to electric power is disclosed, the pre-existing drive mechanism comprising at least one rotatable roller shaft having a drive end coupled to a mechanical gearbox or hydraulic motor housed within a support frame. The conversion method includes the steps of (a) disconnecting the roller shaft from the mechanical gearbox or hydraulic motor assembly; (b) removing the mechanical gearbox or hydraulic motor assembly from the support frame; (c) rigidly connecting a supplementary mounting panel to the support frame at a location spaced apart from the roller shaft drive end; (d) mounting at least one electric motor on the supplementary mounting panel at a fixed location; (e) providing a connector drive shaft having universal joint couplers at first and second ends thereof; and (f) operatively coupling the drive shaft first end to the roller shaft drive end and the drive shaft second end to the motor. The method may also include the step of operatively coupling the motor to a frequency inverter operable by remote control. Optionally, the method may further include the step of mounting a reduction gearbox on the supplementary panel for coupling the motor to the connector drive shaft second end.

An electric drive mechanism for a conveyor comprising rotatable rollers is also disclosed. The drive mechanism includes a plurality of roller shafts loosely coupled to a support frame to permit limited displacement of the shafts relative to the support frame; a plurality of electric motors, wherein each motor independently drives rotation of one of the roller shafts; a plurality of displaceable connector drive shafts each having universal joint couplers at first and second ends thereof, wherein the first end of each drive shaft is operatively coupled to one of the roller shafts and the second end of the drive shaft is operatively coupled to one of the motors. Preferably, the motors are mounted on a panel rigidly connected to the support frame at a spaced location from the roller shafts.

A kit for converting a pre-existing drive mechanism for a conveyor to electric power is also disclosed, the pre-existing drive mechanism comprising at least one rotatable roller shaft displaceably coupled to a support frame. The kit includes a mounting panel rigidly connectable to the support frame at a location spaced-apart from the roller shaft; an electric motor securable in a fixed position on the mounting panel; a connector drive shaft having universal joint couplers at first and second ends thereof, wherein the first end of each drive shaft is operatively connectable to the roller shaft and the second end of the drive shaft is operatively connectable to the motor.

BRIEF DESCRIPTION OF DRAWINGS

In drawings which illustrate the preferred embodiment of the invention but which should not be construed as restricting the spirit or scope of the invention in any way.

DESCRIPTION

Figure 1A:
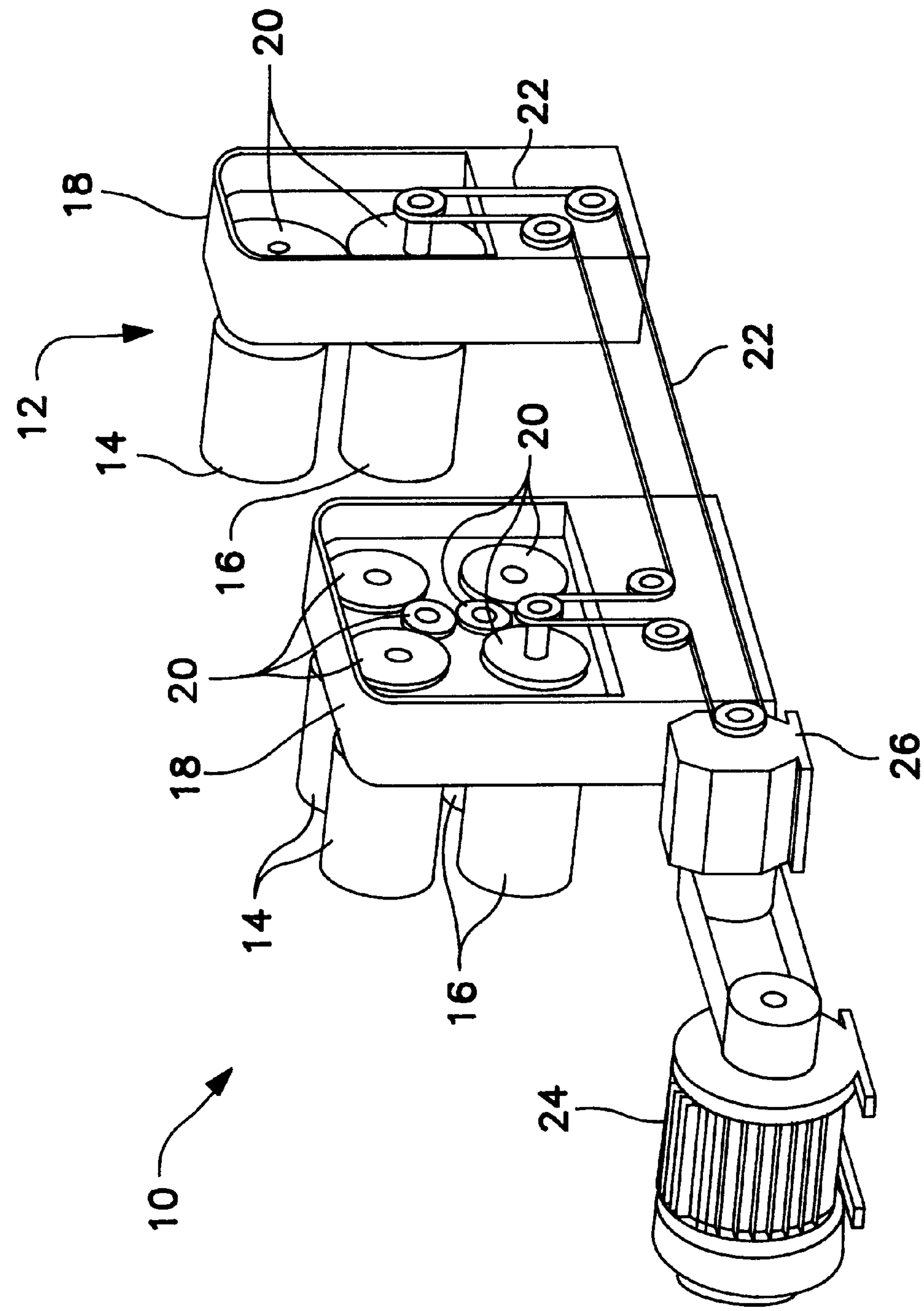
FIG. 1A is an isometric view of a conventional prior art mechanical drive system for driving rotation of the infeed and outfeed rolls of a planer mill.

FIG. 1 illustrates a mechanical drive mechanism for the infeed rolls 10 and outfeed rolls 12 of a conventional lumber processing mill. In the illustrated embodiment two pairs of infeed rolls 10 and one pair of outfeed rolls 12 are shown. Each pair of rolls 10, 12 includes an upper roller 14 and a lower roller 16. Lumber fed between rollers 14,16 is conveyed down the mill production line through wood processing equipment, such as planing tools. The invention may used, for example, in conjunction with a Stedson Ross 614D planer.

Figure 3:
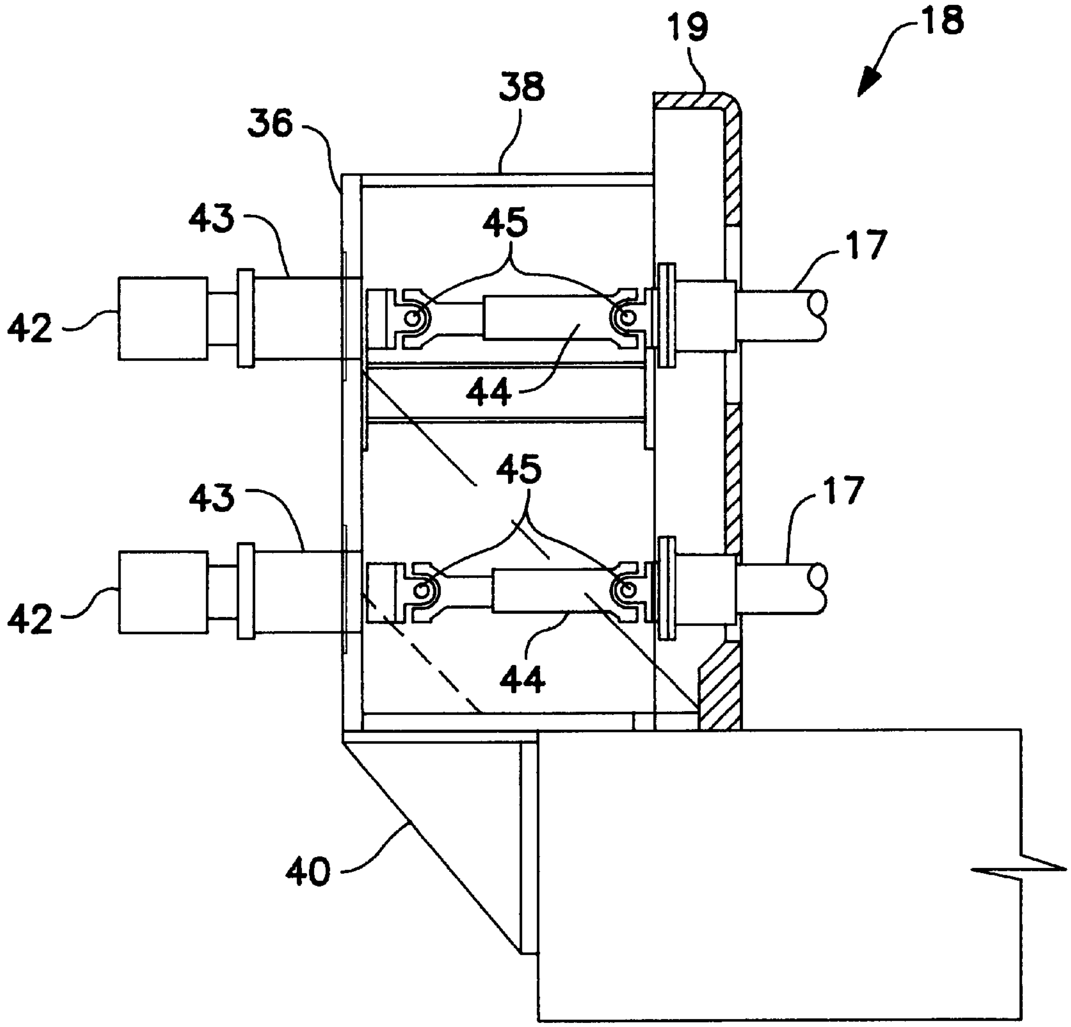
FIG. 3 is a partially fragmented, cross-sectional view of the converted drive system of FIG. 2.

Each roller 14, 16 comprises a rotatable shaft 17 displaceably coupled to a front panel 19 of gearbox 18 (FIG. 3). In FIG. 1 the rear panel of each gearbox 18 has been removed to expose a conventional mechanical drive mechanism comprising a plurality of sprockets 20 operatively connected to an endless belt or serpentine chain 22. Chain 22 is driven by a single electric motor 24, either directly or indirectly through a reduction gearbox 26.

Figure 1B:
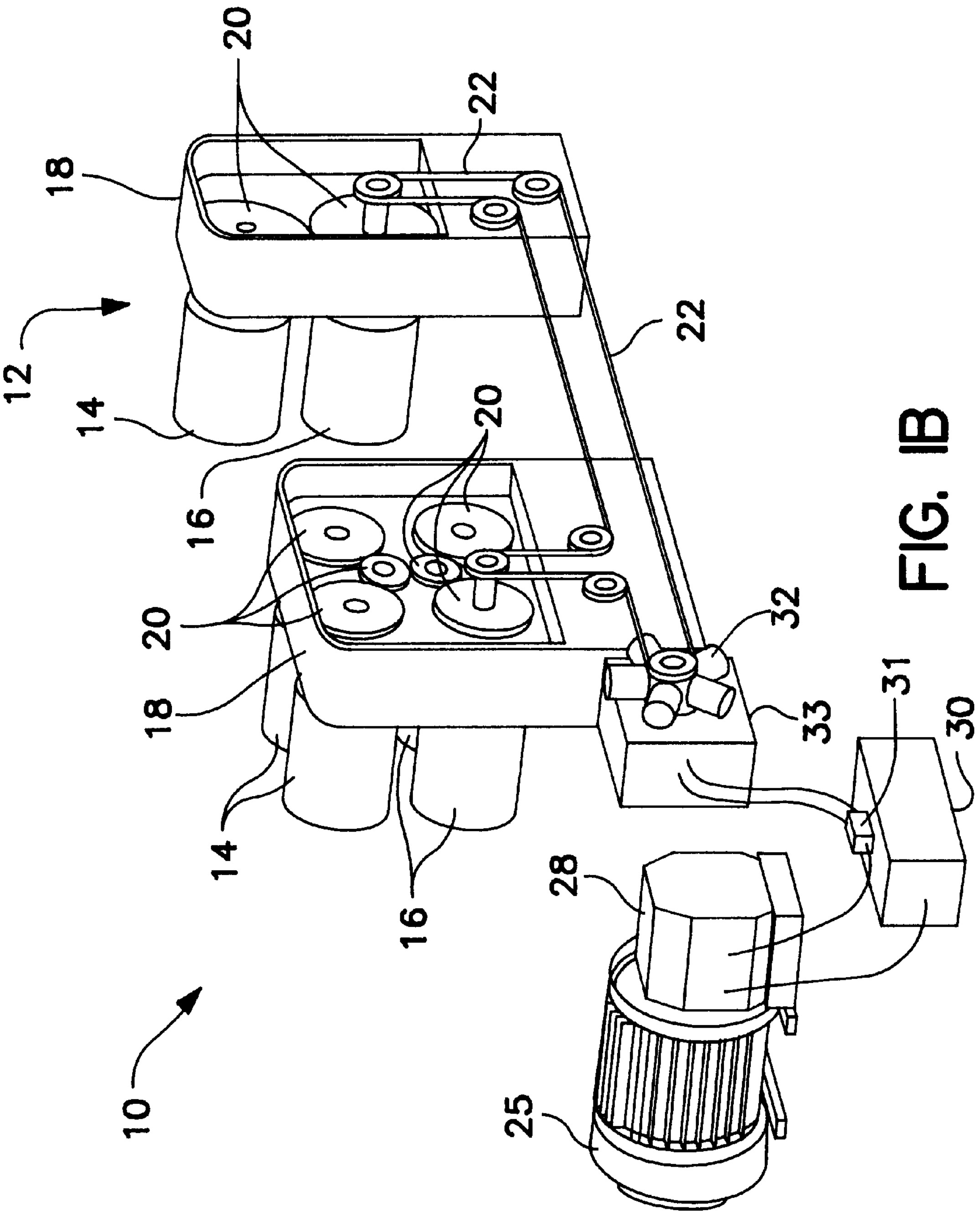
FIG. 1B is an isometric view of a conventional prior art hydraulic drive system for driving rotation of the infeed and outfeed rolls of a planer mill.

As should be apparent to someone skilled in the art, rollers 14, 16 may alternatively be driven by a hydraulic drive system to permit variable frequency operation. A conventional hydraulic drive system is illustrated in FIG. 1B. In this embodiment, a DC electric motor 25 is connected to a hydraulic pump 28 which draws hydraulic fluid from a reservoir 30. Pump 28 propels hydraulic fluid through an adjustable valve 31 to a hydraulic motor 32 shown mounted on a manifold 33. Motor 32 controls the speed of rotation of rollers 14,16.

In operation, lumber passing through the mill is fed between rotating rollers 14, 16 and is conveyed to or through wood processing machinery. The relative vertical spacing between rollers 14, 16 varies depending upon the size, orientation and position of the lumber pieces. For example, when a large piece of lumber is fed between rollers 14, 16, the upper rollers 14 will ordinarily deflect upwardly to accommodate the diameter of the lumber piece and will deflect downwardly to the rest position after the lumber piece has passed therethrough. The roller shafts 17 are loosely coupled to gearbox 18 to permit such vertical displacement.

Figure 2:
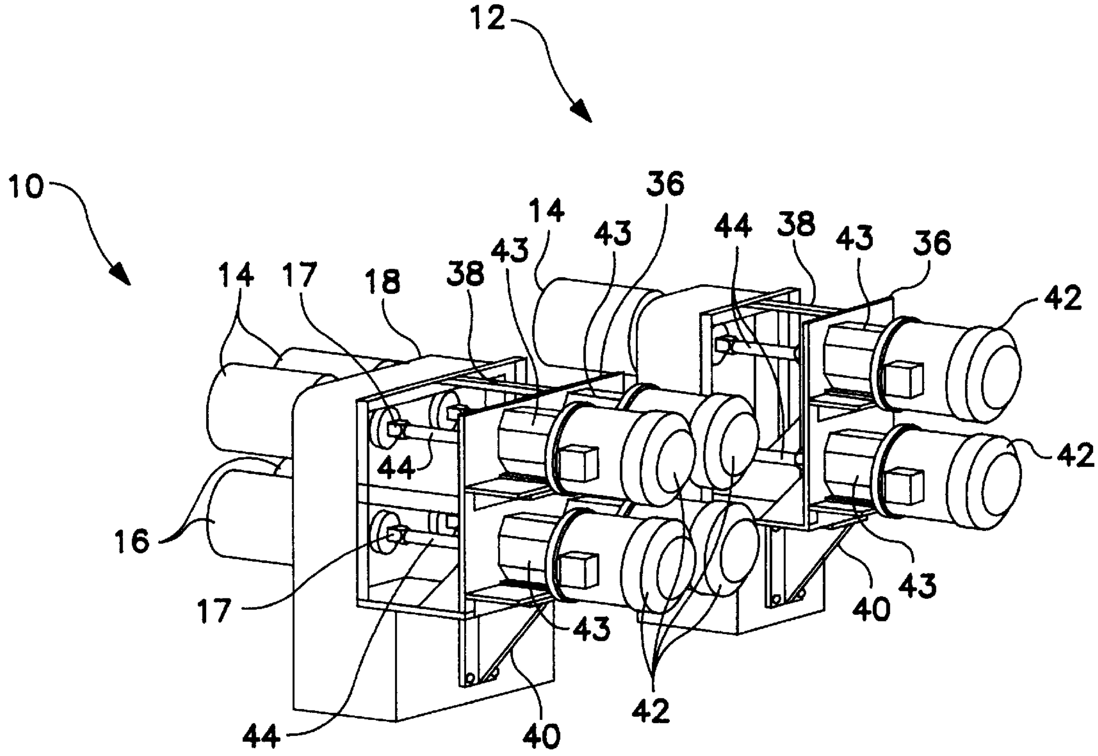
FIG. 2 is an isometric view of the drive system of FIG. 1A or 1B after it has been converted in accordance with the invention to variable frequency electric power.

FIG. 2 illustrates a planer mill drive system after it has been converted to electric power in accordance with the subject invention. In order to achieve the conversion, the mechanical drive assembly comprising sprockets 20 and chain 22 (or any hydraulic equivalents) is removed together with the rear panel of the existing gearbox 18 (or other support frame housing the drive mechanism). A supplementary frame 34 is rigidly connected to each gearbox 18. Supplementary frame 34 includes a vertical panel 36 which is maintained in spaced relation from gearbox 18 by means of braces 38 and 40. A plurality of electric motor assemblies each comprising an electric motor 42 and a reduction gearbox 43 are mounted on panel 36 at fixed locations for driving corresponding rollers 14, 16. General Electric XSD motors (25 HP, 1800 RPM) are suitable for this purpose.

Each electric motor assembly is connected to a respective roller 14, 16 by means of a connector drive shaft 44. Spicer 1550 heavy duty drive shafts available from Dana Corporation of Toledo, Ohio are suitable for this purpose. Universal joint couplers 45 are provided at either end of connector drive shaft 44 for coupling each drive shaft to a respective roller shaft 17 and reduction gearbox 43. When the converted drive mechanism of FIG. 2 is in use, vertical displacement of rollers 14 and 16, as lumber is fed through the mill, will result in some corresponding deflection of connector drive shafts 44. However, motors 42 and reduction gearboxes 43, which are rigidly mounted to panel 36, remain fixed in place. Torque forces resulting from deflection of roller shafts 17 are therefore effectively absorbed by connector drive shafts 44 and are not transferred to motors 42.

As should be apparent from FIG. 2, each roller 14, 16 is independently driven by a separate motor 42 for optimum control. The motor speed may be controlled by a frequency inverter which may be remotely controlled by a manual switch or a computer processor. This arrangement enables better roller control at variable speeds and temperatures than conventional mechanical or hydraulic drive mechanisms. Optimization of roller speeds results in more efficient mill operation and lower energy costs. Moreover, the converted electric drive mechanism of FIG. 2 requires very little on-going maintenance as compared to conventional designs.

Figure 4:
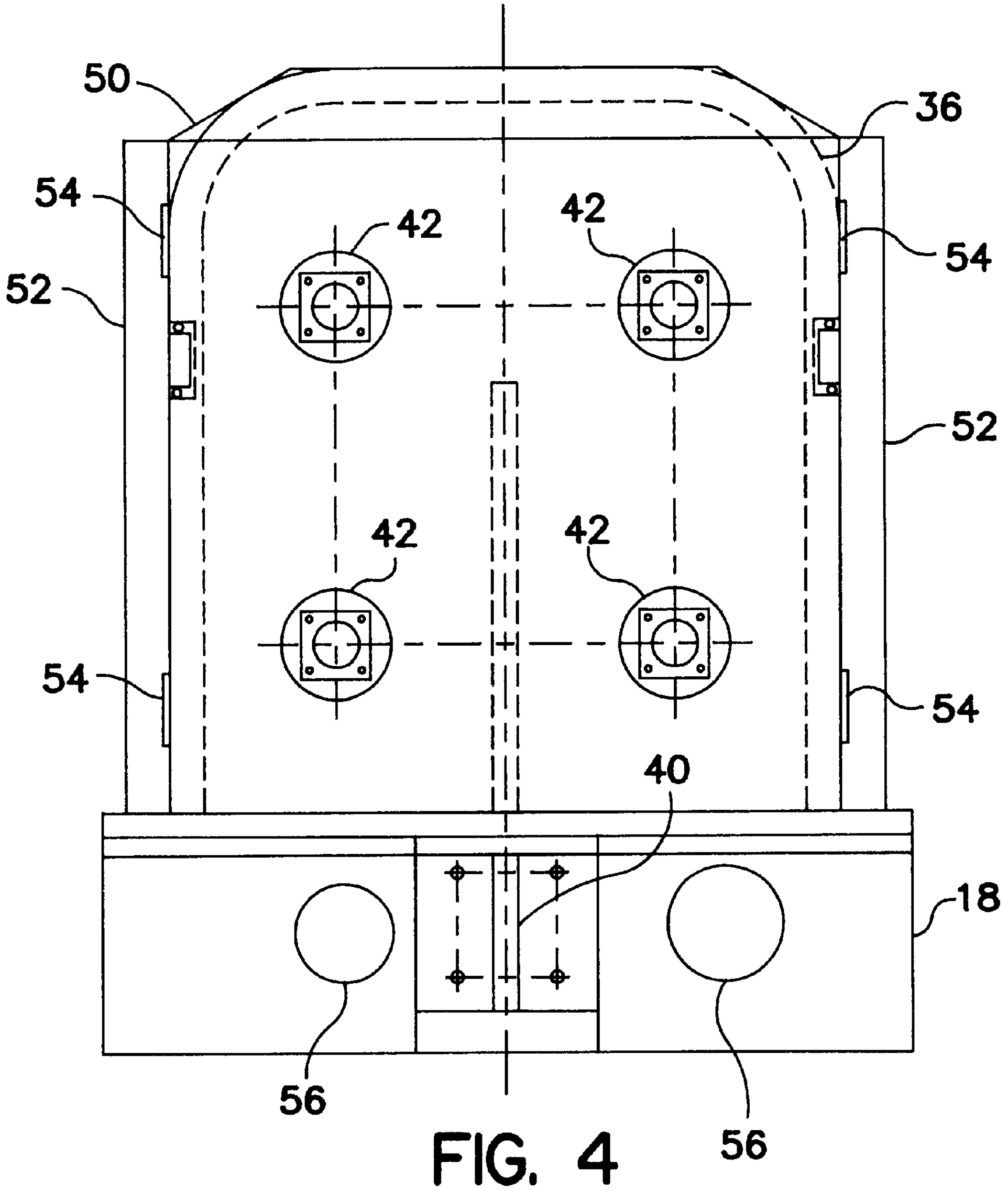
FIG. 4 is an end elevational view of the converted drive system of FIG. 2.

As shown in FIG. 4, drive shafts 44 may be enclosed within a housing having a top panel 50 and side doors 52 which swing about hinges 54. The existing gearbox 18 and vertical panel 36 of the supplementary frame 34 form the end portions of the housing. Although not essential to the functionality of the invention, an enclosed housing is recommended for safety reasons. Parts 56 shown in FIG. 4 do not form part of the invention, but rather indicate reinforced portions of the gearbox 18 where sprockets 20 were mounted prior to the retrofit.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of converting a pre-existing conveyor drive mechanism to electric power, said pre-existing drive mechanism comprising at least one rotatable roller shaft having a drive end coupled to a mechanical gearbox or a hydraulic motor assembly mounted on a support frame, said method comprising the steps of:

(a) disconnecting said roller shaft drive end from said mechanical gearbox or hydraulic motor assembly;

(b) removing said mechanical gearbox or hydraulic motor assembly from said support frame;

(c) rigidly connecting a supplementary mounting panel to said support frame at a location spaced apart from said roller shaft drive end;

(d) mounting at least one electric motor on said supplementary mounting panel at a fixed location;

(e) providing a displaceable connector drive shaft having universal joint couplers at first and second ends thereof; and (f) operatively coupling said drive shaft first end to said roller shaft drive end and said drive shaft second end to said at least one motor.

2. The method claim 1, further comprising the step of operatively coupling said at least one motor to a frequency inverter operable by remote control.

3. The method of claim 1, further comprising the step of mounting a reduction gearbox on said supplementary panel for coupling said at least one motor to said connector drive shaft second end.

* * * * *